No. 814,930. PATENTED MAR. 13, 1906.
P. ARRIETA Y SANZ.
VEHICLE FENDER OR OBSTRUCTION REMOVER FOR ROAD VEHICLES.
APPLICATION FILED OCT. 9, 1903.
2 SHEETS—SHEET 1.
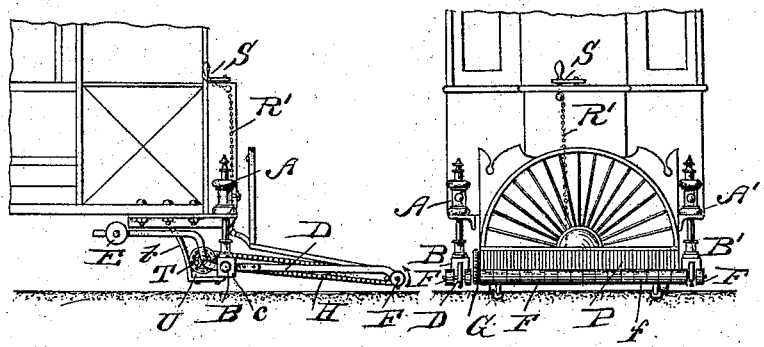
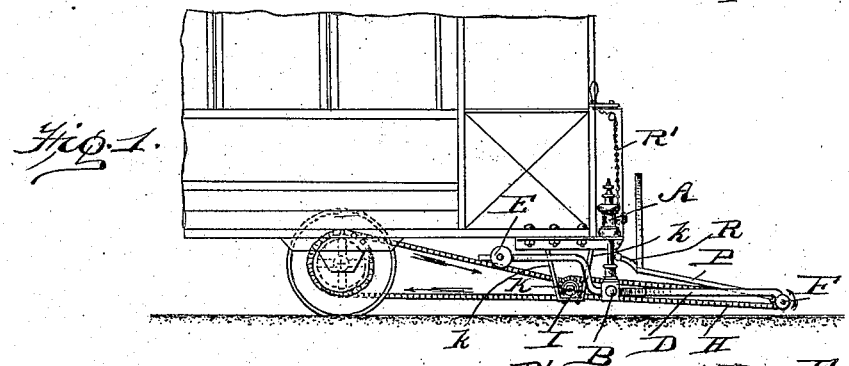
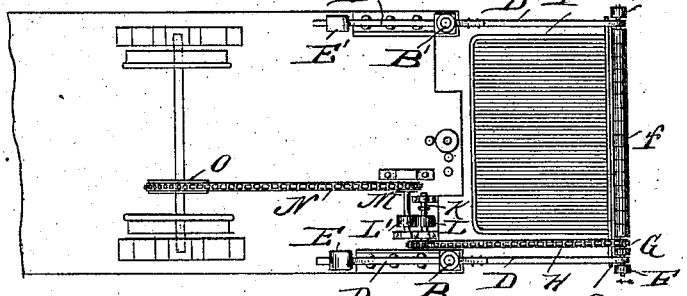
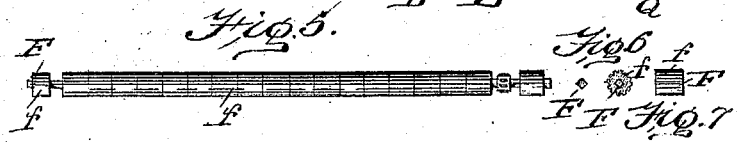
Witnesses:
Harold Kuil
J. M. Wynkoop
Inventor
Pedro Arrieta y Sanz
By Knight Bros
Attorneys

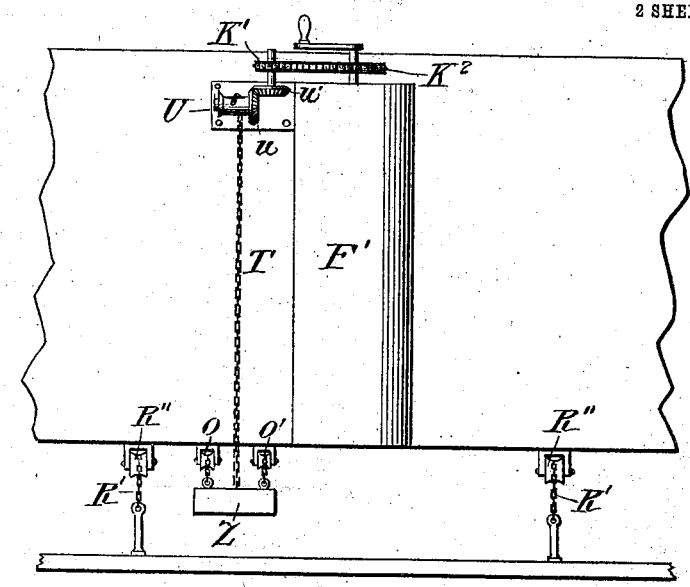
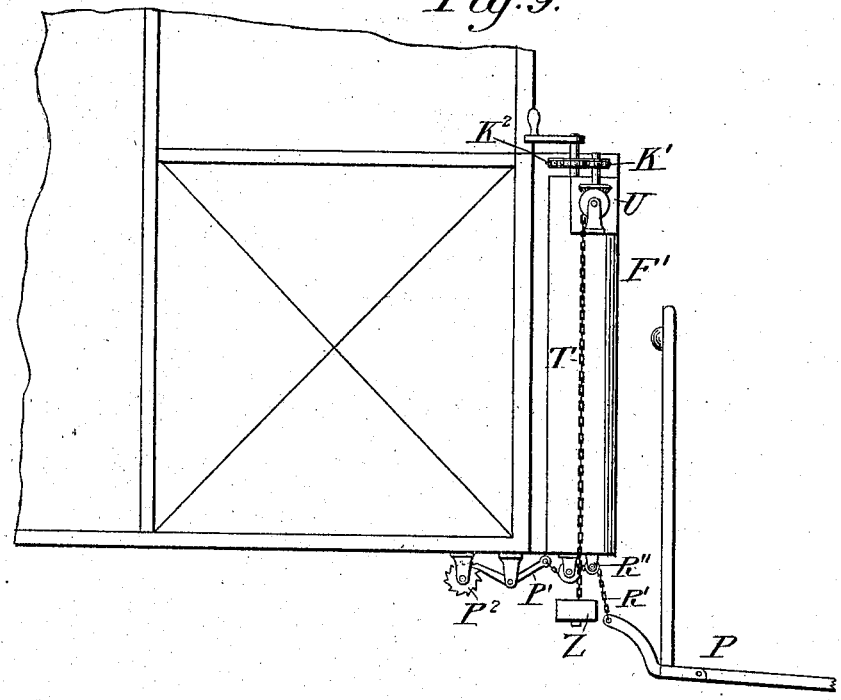

one will

UNITED STATES PATENT OFFICE.

PEDRO ARRIETA Y SANZ, OF PAMPLONA, SPAIN.

VEHICLE-FENDER OR OBSTRUCTION-REMOVER FOR ROAD-VEHICLES.

No. 814,930. Specification of Letters Patent. Patented March 13, 1906.

Application filed October 9, 1903. Serial No. 176,450.

*To all whom it may concern:*

Be it known that I, PEDRO ARRIETA Y SANZ, a subject of the King of Spain, and a resident of San Miguel 8, Pamplona, in the Kingdom of Spain, have invented certain new and useful Improvements in Vehicle-Fenders or Obstruction - Removers for Road - Vehicles, of which the following is a specification.

This invention has reference to wheel-guards or obstruction-removers for road-vehicles, such as electric and steam trams, locomotives, and motor-vehicles, and has for its object to provide a simple, inexpensive, and effective device adapted to be attached to road - vehicles which shall upon encountering an obstacle or person immediately come into operation in such a manner as to raise said obstacle or person out of the way of the vehicle and to convey the same in the wheel-guard with no injury, thus obviating all danger and at the same time automatically act upon the alarm, apply the brake, and cut off the motive power, (electricity, steam, or pressed air,) thereby stopping the vehicle or bringing it to a standstill.

Reference will first be had to the embodiment shown in Figures 1 to 7.

According to my invention I provide a rocking and folding fender or cage arranged in front of the vehicle and mounted in appropriate supports and a bent lever rocking on brackets affixed to the car and carrying at its front extremity a special cylinder. The rear end of said lever carries a counterweight, while its front end carries a spur-wheel, which is connected by appropriate transmission and transforming gears and chains with the wheel or wheels of the vehicle in such a manner that when said vehicle is in motion the aforesaid special cylinder is constantly rotated at a high speed and in a contrary direction to that in which the vehicle is traveling. At the rear of the aforesaid fender or cage I provide suitable means adapted to operate the brake and to cut off the motive power.

In order that my invention may be readily understood and carried into effect, I will now proceed to describe the same fully with reference to the accompanying drawings, in which—

Fig. 1 is a side elevation of a tram - car with my improved obstruction - remover. Fig. 2 is a front elevation of same. Fig. 3 is a bottom plan view of Fig. 1. Fig. 4 is a modification showing a side elevation of my improved device as actuated by a small electric motor instead of being actuated by the wheel or wheels of the tram-car. Figs. 5, 6, and 7 are details of the remover. Fig. 8 is a front view of another embodiment of my invention, and Fig. 9 is a side view of the same.

Similar letters refer to similar parts throughout the several views.

In carrying my invention into effect, I mount upon the front of the vehicle strong iron supports A A', extending downwardly from the platform and having formed at their lower ends or pivoted thereto the brackets B B', as clearly shown in Figs. 1 and 3. On the transverse pins $c$ of each bracket are mounted rocking levers D D D' D', the rear parts of which are bent upward toward but not reaching the platform and have counterweights E E' to hold them in a raised position at their front ends. Through the front ends of said rocking levers D D D' D', which are bent downward, extends a transverse rod F, Figs. 5 and 6, capable of being rotated in the opposite direction of the movement of the vehicle and at a much higher speed than that of said vehicle by means of a spur-wheel G, located on said rotatable rod, a sprocket-chain H, a spur-wheel I, located on a rotatable rod K, which is secured in flanges $k$, extending from the platform, toothed wheels L L', serving to inverse the movement, spur-wheel M, sprocket-chain N, and spur-wheel O, the latter being located on the shaft for the wheels of the vehicle and rotated with said shaft. On the rod F are keyed a number of cylindrical pieces $f$ of rifled rubber or other suitable material, and parallel with and close behind the rod F is firmly secured in the rocking levers D D D' D' a rod Q, carrying pivotally mounted a folding receptacle, cage, or scoop P, the front portion of which is almost touching the rod F; while its rear portion is provided with an arm R and a chain R', connected to the brake of the vehicle S. The connection is made in such a manner that when the cage P is depressed by the weight of an obstacle or person the brake of the vehicle is instantly applied and the power cut off from the motor, thus bringing the vehicle automatically to a stop. The cage, scoop, or receptacle P may be folded back against the vehicle when not in use. Rubber pieces $f$ are fluted, as clearly shown in Fig. 7. This rubber covering is made in pieces of more or less length for convenience in repairs.

When the rifled rubber cylinder hits an obstacle or a person, the rapid rotation of the cylinder will convey the obstacle or person into the scoop. The weight on the fender depresses the cage or scoop P and causing the chains R' R' to operate over the pulleys R'' R'' disengages the bar P' from the spur-wheel P''. Said wheel P'' being at liberty releases the weight Z, which in descending causes the rotation of the crank of the controller-box F'. The cylinder of the box U, secured to the controller-box F', is then rotated by means of the chain T and communicating its movement through the conical wheels $u$ $u'$ and the chain-wheels K' K'' to the crank of the controller-box F' causes the rotation of the shaft of the latter, the brake being thus operated and the motive power cut off. Contact of the front part of the fender against the rails or the ground is prevented by the bent arm of the lever D being hindered in too great movement by the platform.

In the modification shown in Fig. 4 sprocket-chain N and spur-wheel O are dispensed with and cylinder F is rotated in opposite direction to the movement of the car by a suitable electric motor T. The arrangement, which is specially advantageous in cases where the cars are driven by electrical energy, is as follows: A small motor of, say, one-horse power is mounted in the front of the vehicle upon flanges $t$, extending downward from the platform. On the axle of the motor is keyed a pinion U for the sprocket-chain. An interrupter is located in the platform within the reach of the operator, and a current derivation is provided so as to operate the motor independently.

I claim—

1. In a vehicle-fender, the combination of a folding descendible cage or scoop; means attached thereto for automatically applying the brake and cutting off the motive power, when the cage or scoop is caused to descend by the additional weight thrown into it; and a continuously-rotary cylinder calculated to raise the obstacles encountered and convey same into the cage or scoop, and formed by a number of fluted pieces of rifled rubber or other suitable material, keyed on a rod.

2. In a vehicle-fender, the combination of a folding descendible cage or scoop; means attached thereto for automatically applying the brake and cutting off the motive power, when the cage or scoop is caused to descend by an additional weight; a continuously-rotary cylinder calculated to raise the obstacles encountered and throw same into the cage or scoop, and formed by a number of fluted pieces of rifled rubber or other suitable material, keyed on a rod; and oscillating levers, carrying at their front downwardly-bent ends the aforesaid cylinder and at their rear upwardly and horizontally bent ends counterweights serving to hold normally such cylinder in a comparatively raised position, the cage or scoop being caused to descend and act upon the brake of the vehicle by the oscillation of these levers, when the cylinder conveys an obstacle into the cage or scoop.

3. In a vehicle-fender, the combination of a folding descendible cage or scoop; means attached thereto for automatically applying the brake and cutting off the motive power, when the cage or scoop is caused to descend by an additional weight; a continuously-rotary cylinder calculated to raise the obstacles encountered and throw same into the cage or scoop, and formed by a number of fluted pieces of rifled rubber or other suitable material keyed on a rod; oscillating levers carrying at their front downwardly-bent ends the aforesaid cylinder and at their rear upwardly and horizontally bent ends counterweights serving to hold normally such cylinder in a comparatively raised position; and supports and brackets extending downwardly from the platform and pivotally supporting said bent rocking levers, by the oscillation of which the cage or scoop is caused to descend and act upon the brake of the vehicle, when the cylinder conveys an obstacle into the cage or scoop.

4. In a vehicle-fender, the combination of a folding descendible cage or scoop; means attached thereto for automatically applying the brake and cutting off the motive power, when the cage or scoop is caused to descend by an additional weight; a continously-rotary cylinder calculated to raise the obstacles encountered and throw same into the cage or scoop, and formed by a number of fluted pieces of rifled rubber or other suitable material keyed on a rod; oscillating levers carrying at their front downwardly-bent ends the aforesaid cylinder and at their rear upwardly and horizontally bent ends counterweights serving to hold normally such cylinder in a comparatively raised position, the cage or scoop being caused to descend and act upon the brake of the vehicle and interrupter of the motive power by the oscillation of these levers, when the cylinder conveys an obstacle into the cage or scoop; supports and brackets extending downwardly from the platform and pivotally supporting said bent oscillating levers; and means for revolving the cylinder at a high speed and in a direction opposite to the travel of the vehicle.

5. In a vehicle-fender, the combination of a rocking lever, a scoop and a rifled rubber cylinder attached to said lever, means for rotating said cylinder in the opposite direction of the movement of the vehicle, a counterweight on said lever for holding the same in the desired position, and means connected with the fender for automatically cutting off the motive power and operating the brake of the vehicle when the cylinder conveys an obstacle into the scoop.

In testimony whereof I have hereunto set my hand in presence of two subscribing witnesses.

PEDRO ARRIETA Y SANZ.

Witnesses:
 ANGEL AVES DE CARGA Y HERNANDEZ.
 EUGENIO LISARDAZA Y VIRIELGUI.